United States Patent
Magee et al.

(10) Patent No.: US 7,023,931 B2
(45) Date of Patent: Apr. 4, 2006

(54) SYSTEM AND METHOD FOR SOFT SLICING

(75) Inventors: David Patrick Magee, Plano, TX (US); Srinath Hosur, Plano, TX (US); David James Love, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 944 days.

(21) Appl. No.: 10/007,142

(22) Filed: Nov. 5, 2001

(65) Prior Publication Data

US 2003/0086504 A1 May 8, 2003

(51) Int. Cl.
*H04L 23/02* (2006.01)
*H04L 5/12* (2006.01)

(52) U.S. Cl. .......... 375/262; 370/20; 370/339; 370/442; 375/261; 375/298; 375/316; 455/60; 714/786; 714/794; 714/795

(58) Field of Classification Search .......... 375/262; 370/339, 442
See application file for complete search history.

(56) References Cited

U.S. PATENT DOCUMENTS

| 5,550,872 | A | 8/1996 | Liberti, Jr. |
| 5,933,421 | A | 8/1999 | Alamouti et al. ........... 370/330 |
| 5,973,642 | A | 10/1999 | Li et al. |
| 6,018,643 | A | 1/2000 | Golemon et al. ............ 455/63 |
| 6,236,838 | B1 | 5/2001 | Golemon et al. .......... 455/67.1 |
| 6,587,451 | B1 * | 7/2003 | Kwon et al. ................ 370/339 |

FOREIGN PATENT DOCUMENTS

EP 1 304 812 A 4/2003

* cited by examiner

*Primary Examiner*—Stephen Chin
*Assistant Examiner*—Erin M File
(74) *Attorney, Agent, or Firm*—Abdul Zindani; W. James Brady, III; Frederick J. Telecky, Jr.

(57) ABSTRACT

Methods and systems for performing iterative soft slicing methods are disclosed. A data signal is received and processed into individual data tones. A noise estimator provides noise estimates for each data tone. A beamformer utilizes the noise estimates to provide first and second components of a constellation point estimate. A ratio of the first and second components corresponds to the constellation point estimate. A soft slicer uses outputs from the beamformer and noise estimator to determine weighted constellation points without dividing the first component by the second component.

32 Claims, 3 Drawing Sheets

SYSTEM AND METHOD FOR SOFT SLICING

TECHNICAL FIELD

The present invention relates generally to processing of communications signals and, more particularly, to a system and method to simplify soft and hard slicing in a communications system.

BACKGROUND OF THE INVENTION

Various techniques have been developed to facilitate communication of data signals over an associated communications path. The particular communications protocol employed generally depends on the transmission medium, the available bandwidth resources, and other design considerations. Regardless of the type of communications system being employed, noise and distortion often are introduced into data signals transmitted over an associated communications path, including both wired and wireless systems.

Wireless communications systems, such as cellular and personal communications systems, operate over limited spectral bandwidths. Accordingly, multiple access protocols have been developed and used in wireless communications systems to increase bandwidth efficiency. Examples of multiple access protocols include Frequency Division Multiple Access (FDMA), Time Division Multiple Access (TDMA), Code Division Multiple Access (CDMA), and Space Division Multiple Access (SDMA). Features from these and other multiple-access techniques also have been combined in an effort to make highly efficient use of the scarce bandwidth resource to increase the quality of service.

In a wireless system, in which data signals are transmitted through space as modulated electromagnetic waves, distortion and noise can result from interference with other signals within the same frequency range and path as well as due to multipath dispersions. Multipath dispersions occur when signals propagate along different or reflected paths through a transmission medium to a receiving destination. The radio transmissions further are subjected to fading and interference. Fading involves fluctuations in amplitude of a signal, while interference involves unwanted frequencies at the same frequency band. For example, radio transmissions or data signals that travel through the space can be reflected off trees, vehicles, houses, larger buildings, and terrain features such as mountains and hills.

Multipath scattering operates to alter or distort the signal spectrum when compared to the spectrum as transmitted. The effects are different at different frequencies across the signaling band. At some frequencies, the multipath signals add constructively to result in an increased signal amplitude, while at other frequencies the multipath signals add destructively (out of phase) to cancel or partially cancel the signal, resulting in reduced signal amplitude.

A wireless communication system is designed to compensate for interference due to noise and the deleterious effects of multipath dispersion. However, in order to compensate for the noise, an indication of the noise in the signal must first be determined. Thus, it is desirable to know how much noise and/or interference is present in the system. Generally, noise can be measured relative to the signal as a ratio, such as a signal-to-noise ratio (SNR) and a signal-to-interference-to-noise ratio (SINR).

A soft slicer is often used to assign a confidence level or weight to the hard decisions for each data tone. The soft slicer computes a hard slice or hard decision for each bit of the data tone and then assigns a weight or confidence level to each hard slice or hard decision. The soft slicer forms and provides a weighted constellation estimate or weighted symbol for each data tone.

However, computing hard decisions and assigning weights to the hard decisions is a computationally expensive process, as it conventionally requires a significant number of divides. A single divide operation usually takes about 15–20 processor cycles to perform, depending on the precision required. In contrast, a single multiplication, addition or subtraction usually takes about 1 processor cycle to perform.

A system or method is needed that can form weighted constellation estimates with a reduced number of computations and/or processor cycles.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

According to one aspect of the present invention, a soft slicer employs first and second components and noise estimates, such as provided by a noise estimator, to provide weighted symbols or weighted constellation estimates. The soft slicer computes a number of slices or hard decisions for each data tone as a function of the first and second components without the use of a divide operation. The soft slicer also computes a weight for each hard decision, which can be functionally related to the first and second components and the noise estimates. The weights are combined with the hard decisions to form the weighted constellation estimates for the data tones. The weighted estimates can be further processed, such as by decoding of the weighted constellation points and/or error correction. Because the number of divide operations implemented by the slicer is significantly reduced, in accordance with an aspect of the present invention, overall system performance improves accordingly.

Another aspect of the present invention provides a signal processing system. The system includes a beamformer and a soft slicer. The beamformer is operative to compute a first component of a constellation point estimate for a data tone and a second component of the constellation point estimate for the data tone, such that a ratio of the first and second components corresponds to the constellation point estimate for the data tone. The soft slicer employs the first component and the second component to iteratively compute a weighted constellation point estimate, which in a particular aspect of the present invention can include a single divide operation for each data tone.

Still another aspect of the present invention provides a soft slicing method for efficiently producing weighted constellation estimates. A data signal having a plurality of data tones is received. The data signal is processed to provide a digitized signal having the plurality of data tones. Noise estimates are computed for the plurality of data tones. First and second components of constellation point estimates are computed utilizing the noise estimates. Hard decisions are determined as a function of the first and second components, which can be computed without a divide operation relative to the first and second components. A weight is computed for each hard decision as a function the first and second components. The weights are combined with the hard decisions to form weighted constellation point estimates.

The following description and the annexed drawings set forth in certain illustrative aspects of the invention. These aspects are indicative, of but a few ways in which the principles of the invention may be employed. Other advantages and novel features of the invention will become apparent from the following detailed description of the invention when considered in conjunction with the drawings.

BRIEF DESCRIPTION OF THE DRAWINGS

FIG. 6 is a functional block diagram of a wireless communications system in accordance with one aspect of the present invention.

DETAILED DESCRIPTION OF THE INVENTION

The present invention provides a system and method to simplify soft and hard slicing calculations for a communications system. In the frequency domain, a received signal is formed of a data burst or signal that includes tones such as training tones and data tones. A noise estimate is computed for each data tone of the received signal. A beamformer utilizes the noise estimates and at least one received signal to determine a constellation point estimate for each data tone. The beamformer computes first and second components of a constellation point estimate for each data tone. A soft slicer uses the first and second components and the noise estimate from the beamformer to provide weighted symbols or weighted constellation estimates. The soft slicer computes a number of slices or hard decisions for each data tone without the use of a divide operation. The hard decisions are a function of the first and second components. A weight is computed for each hard decision as a function of the first and second components and the noise estimate. The weights are combined with the hard decisions to form a weighted constellation point estimate for each data tone.

Figure 1:
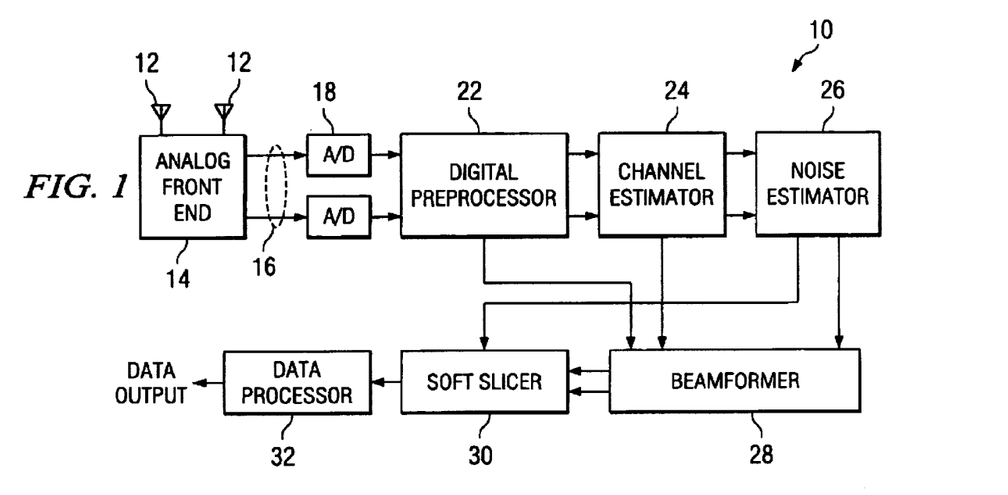
FIG. 1 is a functional block diagram of a wireless receiver system in accordance with an aspect of the present invention.

FIG. 1 illustrates a schematic block diagram of a wireless receiver system 10 in accordance with one aspect of the present invention. The receiver system 10 could be implemented within a subscriber unit and/or at a head end or base station. A received data signal or burst is received at each antenna 12, which captures the data signal and transmits the data signal to an analog front end 14. FIG. 1 shows a system with two antennas 12, however it is appreciated that a receiver that implements the present invention can include any number of antennas and any number of received data signals and is not limited to two antenna and two received data signals. The analog front end 14, for example, can be programmed and/or configured to amplify the data signal, convert the data signal to an intermediate frequency (IF) and filter the data signal to eliminate signals that are outside of the desired frequency band. It is to be appreciated that many variations in receiver front end processing exist. For example, some receiver front end processing includes utilizing multiple IF frequencies and successive frequency conversions. Additional, some receivers can provide direct radio frequency (RF) sampling without IF stages.

The front end component 14 feeds a processed analog signal 16 to one or more analog-to-digital (A/D) converters 18. The A/D converter 18 samples the analog data signal 16 at a predetermined sampling rate and provides a corresponding digitized output signal. The front end processing component 14 also can provide automatic gain control (AGC), such as to maintain the signal strength relative to the A/D converter 18.

The A/D converter 18 is coupled to a digital preprocessor 22 that receives the digitized output signals associated with each antenna 12. The digital preprocessor 22, which can include a Finite Impulse Response (FIR) filter, provides additional filtering of the digitized signal and reduces or decimates the sample of the digitized signal. The digital preprocessor 18 also can include digital automatic gain control to help ensure that the signal is maintained at a desired power level. The digital preprocessor 22 also can include other signal processing components for converting the digitized signal from the time domain to the frequency domain.

By way of example, the digital preprocessor 22 is programmed and/or configured to perform a Fast Fourier Transform (FFT) on the digitized signal. The FFT on the digitized signal converts the signal from the time domain to the frequency domain so that the frequencies or tones carrying data can be processed. The exact implementation of the digital preprocessor 22 can vary depending on the particular receiver architecture being employed to provide the frequencies or tones carrying the data. Once in the frequency domain, the frequencies or tones can then be further processed and demodulated as described herein.

The frequency domain usually includes tones or frequencies modulated onto carriers according to the particular communications protocol being implemented. Of particular interest are multiple access protocols, which allow multiple users to reuse the same communications resources while maintaining the identity of each user. One special case of multiple access protocol is referred to as Orthogonal Frequency Division Multiplexing (OFDM). In general, OFDM is a block-oriented modulation scheme that maps a number of data symbols into a number of orthogonal carriers separated by a distance 1/T where T is a block period. OFDM is a technique by which data is transmitted at a high rate by modulating several low bit rate carriers in parallel rather than one single high bit rate carrier. OFDM is particularly useful in the context of Digital Audio Broadcasting, High Definition Television (HDTV) and also for Asymmetric Digital Subscriber Lines (ADSL). OFDM can also be useful in satellite television systems, cable television, video on demand, interactive services, mobile communication devices, voice services and Internet services.

An important advantage of the OFDM is that intersymbol interference due to signal dispersion in the transmission channel can be reduced by inserting a guard time interval, known as a cyclic prefix, between the transmission of adjacent bursts. This mitigates intersymbol interference, alleviating the need for equalizers as required by single carriers. The guard time allows delayed copies (e.g., reflections) of the current burst symbol to die out before the receiver samples the next burst. Due to this property, OFDM has gained popularity in high data rate systems including wireless broadband applications.

In transmission of a data signal, an OFDM modulator converts a serial data stream into a block of N complex carriers. The sum of the individual carriers, of which phase and amplitude can be modulated in a desired manner (e.g., Quadrature Amplitude Modulation (QAM)), correspond to a time domain waveform that can be generated using an Inverse Discrete Fourier Transform (IDFT). The Inverse Fast Fourier Transform (IFFT) is a well known efficient implementation of the IDFT that performs an N-point IDFT transform. The guard time is inserted into the output of the IDFT and filled in with a copy of the symbol (called a cyclic prefix) to preserve the orthogonality between carriers. At the receiver 10, a data signal or data burst is received in the time domain and the digital preprocessor 22 converts it back into the frequency domain employing an FFT for extraction of the symbols from the data burst. The frequency domain signal is comprised of a plurality of tones, such as data tones, training tones and zero tones. Data tones are tones used to represent data. The training tones are transmitted at known magnitude and phase and employed in determining the channel estimate for use in compensating the data tones due to the effects of the channel on the tones.

The digital preprocessor 22 provides processed frequency domain signals to a channel estimator 24. The channel estimator 24 is programmed and/or configured to provide an indication of the phase and magnitude of the training tones (or pilot tones) of the received data signals. The training tones are transmitted at a known magnitude and phase and are, typically, interspersed in the data signals at spaced carriers.

The channel estimator 24 provides the channel estimates to a noise estimator 26. The noise estimator 26 is programmed and/or configured to compute an indication of the noise level in the frequency domain signals. Typically, noise is computed for a plurality of data tones, although it is to be appreciated that noise estimates also could be computed for a smaller or larger sample of the data tones. Those skilled in the art will understand and appreciate various approaches that can be utilized to compute data tone noise estimates, all of which are contemplated for use in a system according to the present invention. A variance and correlation further can be performed on the noise estimates for each of the received signals. Averaging of the noise estimates (or covariance thereof) also can be performed to provide a time averaged value for the noise estimates at the data tones, although other averaging methods could be used.

The noise estimates are provided to a beamformer 28. At least one signal input, corresponding to received data signals from the antennas 12 in the frequency domain, and at least one channel estimate are also provided to the beamformer 28. The beamformer 28 is programmed and/or configured to compute first and second components of soft decisions and noise-to-signal ratio (NSR) estimates based on the noise estimates from the noise estimator 26 and the channel estimates from the channel estimator 24. The beamformer 28 is typically used in multiple antenna or receiver communication systems. For each data tone, the beamformer 28 provides the first component and the second component. Optionally, the beamformer 28 may provide the NSR estimate for each data tone. The ratio of the first component to the second component provides a constellation point estimate. However, in accordance with an aspect of the present invention, the beamformer 28 is not required to determine or calculate this ratio. As a result, such computationally expensive division operations can be eliminated from the beamforming computations.

The first component corresponds to a numerator of the constellation point estimate and the second component corresponds to a denominator of the constellation point estimate. The first component is a function of at least one signal input, one channel estimate and one noise estimate. The second component is a function of at least one channel estimate and one noise estimate. The NSR ratio estimate, if provided, is a function of the noise estimate and the second component.

A soft slicer 30 receives the first and second components from the beamformer 28. The soft slicer 30 receives noise estimates from the noise estimator 26. The soft slicer can receive the NSR estimates instead of or in addition to the noise estimates as the NSR estimate is functionally related to the second component and the noise estimate. The soft slicer 30 provides weighted constellation points. The weighted constellation points, or symbols, are weighted to identify data integrity and/or data reliability. A weighted constellation point is computed for each data tone.

By way of example, the soft slicer 30 computes a number of slices and corresponding weights for each data tone. The slices are a function of the first and second components from the beamformer 28. The slices are calculated iteratively without a divide operation. For each slice, the soft slicer 30 also computes a weight or weight metric representative of the reliability and/or integrity of that slice. The weight is calculated iteratively as a function of the first and second components and the noise estimates. In an alternate aspect of the invention, the weight is calculated iteratively as a function of the first and second components and the determinant of the noise estimate matrix R. The weights for a single data tone may be calculated with only 1 divide operation. The weights are combined with corresponding hard decisions to provide a weighted constellation point estimate for each data tone. The hard decisions may also be referred to as hard slices here, and throughout this description of the present invention.

For illustrative purposes, assume a 4 QAM system represents 2 bits of data with 4 possible constellation points, (1,1), (−1,1), (−1,−1) and (1,−1). Because of noise in the communications system, a first received constellation point may actually be (0.8,0.8) instead of the transmitted constellation point (1,1). A second received constellation point may be (0.1,−0.2) instead of the transmitted constellation point (1,−1). The first received constellation point is a good representation of a valid constellation point because it is close to the actual value. Thus, the first received constellation point would have a high weight or confidence associated with it. The second received constellation point is a poor representation of a valid constellation point and thus would have a low weight or confidence associated with it. It is appreciated that the present invention is not limited to 2 bit, 4 QAM representations and may include other types of representations such as, but not limited to, 16 QAM, 64 QAM and 256 QAM.

A data processing block 32 receives the weighted constellation points from the soft slicer 30. The data processing block 32 can include a decoder, such as a Viterbi decoder and/or Reed Solomon (RS) decoder. The data processing block 32 utilizes the weighted constellation points to identify errors in the data stream and correct them. The data processing block 32 provides the corrected data stream to other layers for processing.

Figure 2:
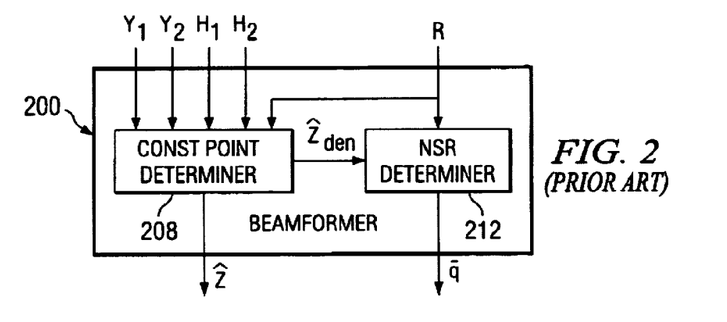
FIG. 2 is a functional block diagram of an exemplary conventional beamformer.

FIG. 2 illustrates an example of a conventional beamformer 200. The beamformer 200 receives digitized frequency domain data signals $Y_1$ and $Y_2$, channel estimates $H_1$ and $H_2$ from a channel estimation function, and a matrix of noise estimates R from a noise estimator.

The beamformer 200 outputs a constellation point estimate $\hat{Z}$ and a NSR estimate $\bar{q}$. The constellation point estimate $\hat{Z}$ and a NSR estimate $\bar{q}$ are usually employed by subsequent processing stages to perform slicing, decoding and error correction based on the outputs so as to determine symbol values. The beamformer 200 includes a first constellation point determiner 208 and a NSR determiner 212.

The constellation point determiner 208 receives the data signals $Y_1$ and $Y_2$, channel estimates $H_1$ and $H_2$ from a channel estimation function, and noise matrix or noise estimates R from a noise estimator. The constellation point determiner 208 computes the constellation point estimate $\hat{Z}$ as a function of the data signals, channel estimates and noise estimates. The constellation point determiner also can provide $\hat{Z}_{den}$, which is the denominator of the constellation point estimate $\hat{Z}$, to the NSR determiner 212.

The relationship of $\hat{Z}_{num}$ and $\hat{Z}_{den}$ to the constellation point estimate $\hat{Z}$ is shown in Eq. 1. This relationship is shown as:

$$\hat{Z}[k] = \frac{\hat{Z}_{num}[k]}{\hat{Z}_{den}[k]} \quad (1)$$

where: k is an index for each of the data tones, e.g., $k \in \{0, 1, \ldots, N_{data}-1\}$; and $N_{data}$ is the number of data tones.

The NSR determiner 212 receives the noise estimate matrix R and $\hat{Z}_{den}$ from the constellation point determiner 208. The NSR determiner computes the NSR estimate $\bar{q}$ as a function of the noise estimate matrix R and $\hat{Z}_{den}$.

Figure 3:
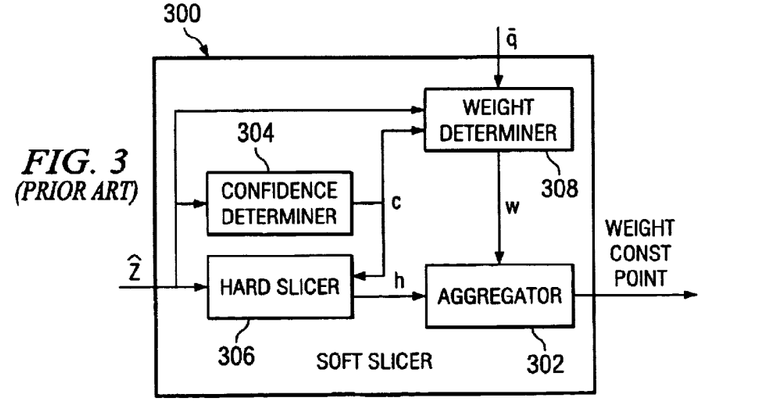
FIG. 3 is a functional block diagram of an exemplary conventional soft slicer.

FIG. 3 illustrates an example of a conventional soft slicer 300. The soft slicer 300 is operative to compute and provide weighted constellation estimates. The slicer 300 receives outputs of a beamformer or a beamforming process, such as shown and described with respect to FIG. 2. That is, the slicer 300 receives a constellation point estimate $\hat{Z}$ and a NSR estimate $\bar{q}$.

A hard slicer 306 that receives a constellation point estimate $\hat{Z}$. The hard slicer 306 computes a number of hard decisions for each data tone as a function of computed confidence values, which can be represented by the following set of equations:

$h_0 = \text{hard}(2 \cdot \hat{Z} + 1)$ $h_1 = \text{hard}(2^m - c_0)$ $h_2 = \text{hard}(2^{m-1} - c_1)$ $h_3 = \text{hard}(2^{m-2} - c_2) \quad (2)$ where the hard function is defined as:

$$\text{hard}(x) = \begin{cases} 0 & \text{for } x < 0 \\ 1 & \text{for } x > 0 \end{cases} \quad (3)$$

where m represents the number of iterations and $m = \log_4(\text{constSize})$, the base-4 logarithm of the constellation size used in the digital communication. Since the constellation point estimate $\hat{Z}$ is a complex number, there will be m iterations for the real part and m iterations for the imaginary part.

For smaller constellations, only the first m slices are used for the real and imaginary parts of the constellation point estimate. As is shown in Eq. 2, the hard decisions are computed as a function of the constellation point estimate $\hat{Z}$ and confidences provided by a confidence determiner 304.

The confidence determiner 304 iteratively computes confidences c for use by the hard slicer 306. Iterative equations that the confidence determiner 304 may employ to compute confidences follow. The confidences $c_i$ computed by the confidence determiner and used in Eq. (2) are defined as follows:

$c_0 = |2 \cdot \hat{Z} + 1|$ $c_1 = |2^m - c_0|$ $c_2 = |2^{m-1} - c_1|$ $c_3 = |2^{m-2} - c_2| \quad (4)$ A weight determiner 308 determines a weight or weight metric for each of the hard decisions computed by the hard slicer 306. The weight determiner 308 receives the constellation point estimate $\hat{Z}$ and the NSR estimate $\bar{q}$. The weight determiner 308 computes the weights, $w_i$, such as by using the following equation:

$$w_i = \frac{c_i}{\bar{q}} \quad (5)$$

The aggregator 302 combines the hard decisions h and weights w to form a weighted constellation point estimate. The conventional soft slicer 300 and beamformer 200, according to Equations (2), (4) and (5), require a total of 11 divides for each data tone value (e.g., two divides for $\hat{Z}$, one divide for $\bar{q}$ and eight divides for $w_i$). However, most processors do not have a single cycle divide. As a result, division is usually done by a series of subtractions. Accordingly, for 16 bits of precision in a conventional system, this means at least 16 cycles for each divide. So, the conventional soft slicer 300 and beamformer 200 would require a total of about 176 cycles for each data tone to yield 16 bits of precision.

Figure 4:
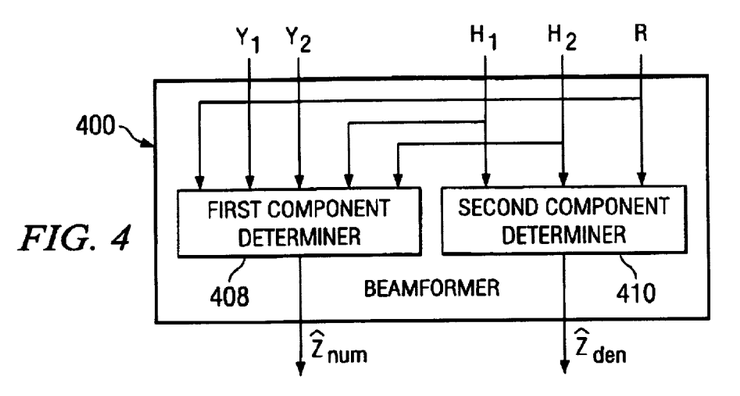
FIG. 4 is a functional block diagram of a beamformer in accordance with one aspect of the invention.

FIG. 4 illustrates a beamformer 400 in accordance with one aspect of the present invention. The beamformer can be used in a communication system, such as the system shown in FIG. 1. The beamformer 400 receives digitized frequency domain data signals $Y_1$ and $Y_2$, channel estimates $H_1$ and $H_2$ from a channel estimation function, and noise estimate matrix R from a noise estimator. It is appreciated that FIG. 4 shows signals and channel estimates corresponding to a two-antenna system. However, it is appreciated that any number of data signals and/or channel estimates are contemplated as falling within the scope of the present invention.

The beamformer 400 outputs a first component $\hat{Z}_{num}$ and a second component $\hat{Z}_{den}$ which are employed by subsequent processing stages to perform slicing, decoding and error correction based on the outputs so as to determine symbol values. The beamformer includes a first component determiner 408 and a second component determiner 410.

A ratio of the first component $\hat{Z}_{num}$ and the second component $\hat{Z}_{den}$ form a constellation point estimate $\hat{Z}$, as shown in Eq. 1. However, it is appreciated that this ratio is not necessarily calculated by beamformer 400. This ratio is shown as Eq. 6, which is identical to Eq. 1:

$$\hat{Z}[k] = \frac{\hat{Z}_{num}[k]}{\hat{Z}_{den}[k]} \qquad (6)$$

where: k is an index for each of the data tones, e.g., k ∈{0,1, . . . , $N_{data}$−1};
and $N_{data}$ is the number of data tones.

The first component determiner 408 computes the first component as a function of data signals $Y_1$ and $Y_2$, channel estimates $H_1$ and $H_2$ and noise estimate matrix R. The first component can be computed using Eq. 7, as follows:

$$\hat{Z}_{num}[k] = [H_1^*[r] \ H_2^*[r]][\text{adj}R[r]]\begin{bmatrix} Y_1[r] \\ Y_2[r] \end{bmatrix} \qquad (7)$$

where: k is an index for each of the data tones, e.g., k ∈{0,1, . . . , $N_{data}$−1};
$N_{data}$ is the number of data tones; and
r is the bit reversed value of the training tone index k.

The second component determiner 410 computes the second component as a function of channel estimates $H_1$ and $H_2$ and noise estimate matrix R. The second component can be computed using Eq. 8, as follows:

$$\hat{Z}_{den}[k] = [H_1^*[r] \ H_2^*[r]][\text{adj}R[r]]\begin{bmatrix} H_1[r] \\ H_2[r] \end{bmatrix} \qquad (8)$$

where: k is an index for each of the data tones, e.g., k ∈{0,1, . . . , $N_{data}$−1};
$N_{data}$ is the number of data tones; and
r is the bit reversed value of the training tone index k.

Figure 5:
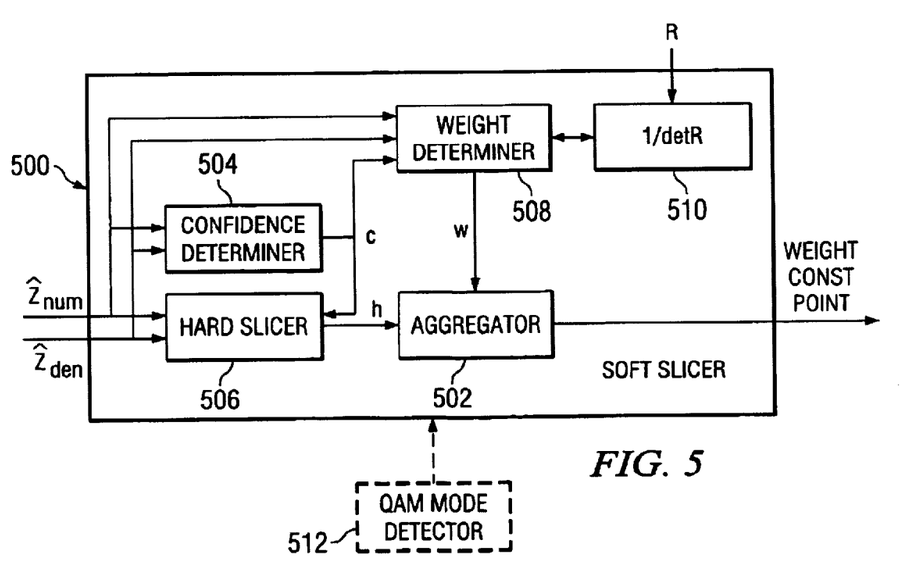
FIG. 5 is a functional block diagram of a soft slicer in accordance with one aspect of the present invention.

FIG. 5 illustrates a soft slicer 500 according to one aspect of the present invention. The soft slicer 500 can be used in a communications system, such as the system shown in FIG. 1. The soft slicer 500 is operative to compute and provide weighted constellation estimates. The slicer 500 receives outputs of a beamformer or a beamforming process, such as shown and described with respect to FIG. 4. For example, the slicer 500 receives a first component $\hat{Z}_{num}$ a second component $\hat{Z}_{den}$ and a noise estimate matrix R. A ratio of the first component $\hat{Z}_{num}$ and the second component $\hat{Z}_{den}$ would provide a constellation point estimate.

The slicer 500 includes an aggregator 502, a confidence determiner 504, a hard slicer 506, a weight determiner 508 and a noise determinant component 510. Optionally, the slicer 500 may include a QAM mode detector 512. The confidence determiner 504 is coupled to the hard slicer 506 and the weight determiner 508. The weight determiner 508 is coupled to the noise determinant component 510. The aggregator 502 is coupled to the weight determiner 508 and the hard slicer 506.

The hard slicer 506 receives the first component $\hat{Z}_{num}$ and the second component $\hat{Z}_{den}$. In an alternate aspect of the invention, the first component $\hat{Z}_{num}$ is a numerator portion of the constellation point estimate and the second component $\hat{Z}_{den}$ is a denominator portion of the constellation point estimate. The hard slicer 506 iteratively computes a number of hard decisions for each data tone, without using a divide operation. The number of iterations is functionally related to the number of bits used to represent a point in a given constellation. A device such as the QAM mode detector 512 may determine the number of iterations. For example, QAM mode detector 512 can compute the number of iterations as the base-4 logarithm of the constellation size. Thus, for a 256 QAM system, 4 hard decisions are required for the real and imaginary parts of the constellation point estimate. According to one aspect of the present invention, hard decisions may be computed as follows:

$h_0 = \text{hard}(2 \cdot \hat{Z}_{num} + 1)$ $h_1 = \text{hard}(2^m \cdot \hat{Z}_{den} - c_0)$ $h_2 = \text{hard}(2^{m-1} \cdot \hat{Z}_{den} - c_1)$ $h_3 = \text{hard}(2^{m-2} \cdot \hat{Z}_{den} - c_2) \qquad (9)$ where the hard function is defined as:

$$\text{hard}(x) = \begin{cases} 0 & \text{for } x < 0 \\ 1 & \text{for } x > 0 \end{cases} \qquad (10)$$

where m represents the number of iterations and m=$\log_4$(constSize), the base-4 logarithm of the constellation size used in the digital communication. For smaller constellations, only the first m slices are used for the real and imaginary parts of the constellation point estimate.

The confidence determiner 504 iteratively computes confidences c for use by the hard slicer 506 and the weight determiner 508. Examples of iterative equations that the confidence determiner 504 may employ to compute confidences for a 256 QAM system are as follows:

$c_0 = |2 \cdot \hat{Z}_{num} + 1|$ $c_1 = |2^m \cdot \hat{Z}_{den} - c_0|$ $c_2 = |2^{m-1} \cdot \hat{Z}_{den} - c_1|$ $c_3 = |2^{m-2} \cdot \hat{Z}_{den} - c_2| \qquad (11)$ The confidence determiner 504 thus computes confidence values without any divide operations, which values are provided to the hard slicer 506 for use in iteratively computing the hard decisions.

The weight determiner 508 determines a weight or weight metric for each of the hard decisions computed by the hard slicer 506. The weight determiner 508 receives the first component $\hat{Z}_{num}$, the second component $\hat{Z}_{den}$ and the noise estimate matrix R. The weight determiner 508 computes weights as a ratio of the computed confidences and the determinant of the noise estimate matrix R. The noise estimate matrix R may be obtained from a noise estimator. It is appreciated that alternate aspects may use other noise components and variations thereof instead of the noise estimate matrix R, such as an indication of noise estimates, noise estimates, signal to noise ratios and the like. Furthermore, it is appreciated that in alternate aspects, the noise estimate matrix R and the like can be computed utilizing decimation. Examples of iterative equations that the weight determiner 508 may employ to compute the weights for a 256 QAM system are as follows:

$$w_0 = \frac{c_0}{\det R} \quad (12)$$

$$w_1 = \left| 2^m \cdot \frac{\hat{Z}_{den}}{\det R} - w_0 \right|$$

$$w_2 = \left| 2^{m-1} \cdot \frac{\hat{Z}_{den}}{\det R} - w_1 \right|$$

$$w_3 = \left| 2^{m-2} \cdot \frac{\hat{Z}_{den}}{\det R} - w_2 \right|$$

Because the equation for each weight includes the determinant of the noise estimate matrix R, only one divide is required per data tone, which is as follows:

$$\frac{1}{\det R} \quad (13)$$

The inverse of the determinant can be stored in the noise determinant component 510 or other suitable memory and used by the weight determiner 508 for the weight calculations.

It can be desirable to compute the inverse of the determinant of the noise estimate matrix R at a decimated rate. The inverse of the determinant can be stored in an array to reduce the number of computations per burst. During a particular data burst, only 1/g of the array values are updated, where g is a natural number that defines the decimation rate. As a result, a higher value of g results in an increased level of decimation. This decimated computation of the determinant inverse can be implemented in the noise determinant component 510.

The weight determiner 508 calculates successive iterations of weights w (see, e.g. Eq. 12) without performing additional divide operations. The calculated weights w correspond to reliability and/or integrity of a given constellation point. The weights w can be represented using any number, such as 2 or 3 bits.

The aggregator 502 combines the hard decisions h and weights w to form a weighted constellation point estimate. Each weighted constellation point estimate corresponds to the constellation point defined by the first component $\hat{Z}_{num}$ and the second component $\hat{Z}_{den}$. The weights may be in sign magnitude or bit offset format.

The soft slicer 500 is able to compute weighted constellation estimates faster and with less processor cycles than a conventional soft slicer because of the significant reduction in computationally expensive divide operations. For example, the conventional soft slicer and beamformer, according to Equations (2), (4) and (5) requires a total of 11 divides that must be performed for each data tone value (e.g., two divides for Z, one divide for $\bar{q}$ and eight divides for $w_1$). However, most processors do not have a single cycle divide. As a result, division is usually done by a series of subtractions. Accordingly, for 16 bits of precision in a conventional system, this means at least 16 cycles for each divide.

The soft slicer 500, in accordance with an aspect of the present invention, only requires only one divide operation for each data tone, however, three new multiplications must be performed. But, multiplications are less costly in terms of processing cycles. A typical divide operation takes about 16 processor cycles but a typical multiplication takes only 1 processor cycle.

For an exemplary implementation with 432 data tones, a conventional slicer, such as shown in FIG. 3, would require about 4,700 divides for one set of data tones, which would take around 76,000 processor cycles. Thus, the conventional slicer could require a processor dedicated to performing the large number of operations required for the slicer calculations. In contrast, a soft slicer in accordance with an aspect of the present invention would only require 432 divides for the same set of data tones, which would require around 6900 processor cycles. Accordingly, the soft slicer 500 is much more computationally efficient than the conventional system described above, such that overall system performance can be improved. It is appreciated that the soft slicer 500 of FIG. 5 is not limited to a certain bit size or certain constellation size.

Figure 6:
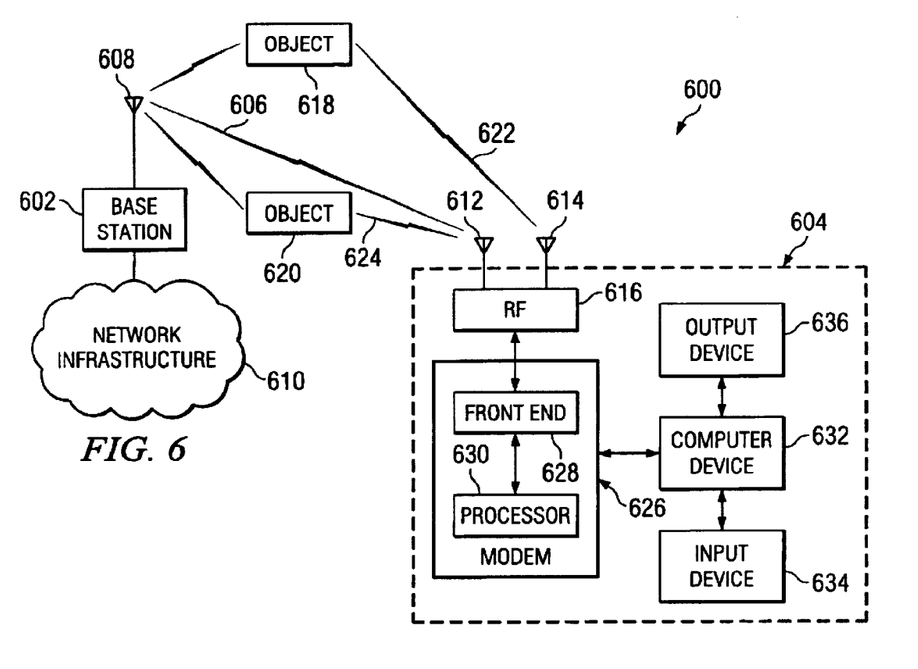

FIG. 6 illustrates one example of a possible implementation of the present invention as it applies to a wireless communications system 600. The system includes a base station 602 and one or more subscriber units 604. The base station 602 includes a transceiver that is operative to both transmit and receive data signals 606 via an antenna system 608 (e.g., one or more antennas) wirelessly through an environment to selectively communicate information to and from the subscriber units 604. The base station 602 is coupled to a network infrastructure 610 via a server (not shown) or the like. The network infrastructure 610, for example, can include the Internet, an intranet or other type of network infrastructure. The base station 602 or its associated server (not shown) are programmed and/or configured to facilitate communication of network information relative to the network infrastructure 610 using a defined network protocol (e.g., TCP/IP, Fiber channel, etc.). The network information, for example, can include interactive video and/or audio data as well as other types of data.

For each data burst from the antenna system 608, the main data burst signal 606 is transmitted and received by one or more antennas 612 and 614 that are operatively coupled to a RF transceiver 616. The main data burst signal 606 usually reflects off one or more objects 618 and 620 in the environment, causing each of the antennas 612 and 614 to receive a plurality of reflected signals 622 and 624 in addition to the main data burst signal 606. The transceiver 616 includes a receiving device that converts the received RF signals into corresponding electrical signals, which are transferred to a modem 626. The transceiver 616 also includes a transmitter coupled to the antennas 612 and 614 for transmitting request data to the base station 602. It is appreciated that, while the RF transceiver 616 is illustrated as being external to the modem 626 at the subscriber unit, the transceiver could be integrated into the modem in accordance with an aspect of the present invention. Alternatively, the modem 626 could be incorporated into a set top box, the antennas 612 and 614, a personal computer, a hand-held computer, and/or other microprocessor-based appliance.

The modem 626 includes front end hardware and/or software 628 coupled to receive analog signals from the transceiver 616. The front end 628 is programmed and/or configured to amplify, filter and/or digitize the electrical signals corresponding to signals or bursts received at the antennas 612 and 614. The front end 628, for example, is coupled to signal processor 630, which can be implemented within a DSP, an ASIC or other signal processing component that is programmed and/or configured to process the digitized signal in accordance with an aspect of the present invention. That is, the signal processor 630 is operative to extract training tones from the digitized signals and perform noise estimates on the extracted training tones. When the modem receives wireless signals at more than one antenna, such as in the example of FIG. 6, noise estimates are performed on the signals from each of the antennas. Further, the signal processor 630 can employ the noise estimates to perform additional computations to derive first and second components of constellation estimates. After the components of constellation estimates have been computed, the signal processor 630 performs hard and soft slicing to derive weighted constellation symbols in accordance with an aspect of the present invention. The signal processor 630 iteratively computes a number of hard decisions for each data tone. The hard decisions are computed as a function of the constellation estimate components without requiring a divide operation. The signal processor 630 derives a weight or weight metric for each of the number of hard decisions. The weights are iteratively derived using only one divide operation for each data tone. The weights are derived as a function of the noise estimate matrix determinant and the components of the constellation point estimates. The weights are combined with the hard decisions, for each data tone, to form a weighted constellation point. Then, the weighted constellation points are decoded and demodulated.

The modem 626 is coupled to a computer device 632, which handles additional processing steps and provides a mechanism for user interaction with the information being communicated through the communications system. The computer device 632, for example, can be a personal computer, an Internet appliance, or other microprocessor-based device operative to receive and/or send information relative to the modem 626. It is to be understood and appreciated that the modem 626 also could be integrated into the computer device 632.

The computer device 632 is coupled to an input device 634 for receiving instructions from a user directly or indirectly by a remote link. An output device 636 is also provided, so that selection information and requests can be displayed to the user. The computer device 632 can include computer-executable instructions for providing task selections, requests and control to a user and allowing a user to interact with information available over the network infrastructure 610. It will be understood and appreciated that the applicability of the present invention is not limited to a particular configuration of communication system and those skilled in the art further will appreciate many other communication implementations that can be employed in accordance with an aspect of the present invention.

Figure 7:
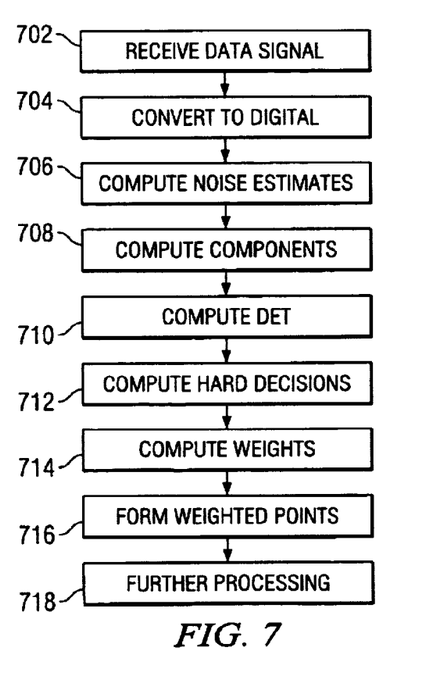
FIG. 7 is a flow diagram illustrating a method of receiving a data signal in accordance with one aspect of the present invention.

FIG. 7 is a flow diagram of a method of receiving a data signal according to one aspect of the present invention. While the following method is illustrated with a single data signal, it is to be appreciated that the methodology can be implemented on more than one signal or burst in accordance with an aspect of the present invention. Additionally, the methodology can be implemented on both wired and wireless data signals, although, for purposes of brevity, the following describes the procedure as applied to a wireless signal. That is, the methodology has applications on any type of communications system that utilizes slicing.

The methodology begins at block 702, in which a data signal or data burst is received. Preprocessing also can be performed on the received signal, such as amplification, filtering and/or conversion of the received signal into the frequency domain. The data signal comprises tones such as data tones and training tones. The data signal may contain other types of tones. The data tones represent data. The data signal is converted into a digital signal at block 704. Noise estimates are computed for the data tones at block 706. Additionally, a covariance of the noise estimates may be computed to provide a covariance matrix. First and second components of constellation point estimates are computed at block 708 for the data tones, such as by a beamformer. A ratio of the first and second components provides the constellation point estimate. The first and second components are computed utilizing the noise estimate, channel estimates and digitized signals for each data tone. The determinant of the noise estimate matrix R is computed at block 710 for each data tone.

A plurality of hard decisions are iteratively computed for each data tone at block 712 without performing a divide operation. The hard decisions are iteratively computed as a function of the first and second components and confidences. The confidences, which are used in calculating the plurality of hard decisions, can also be computed without a divide operation. A plurality of weights are computed for each data tone at block 714. The plurality of weights correspond to the plurality of hard decisions. The weights are iteratively computed as a function of the first and second components and the determinant of the noise estimate matrix R for each data tone. The number of iterations performed for blocks 712 and 714 are a function of the constellation size. For example, in digital communications, the number of iterations performed is the base-4 logarithm of the constellation size. Thus, for example, a constellation size of 256 would yield 4 iterations for the real and imaginary components of the constellation point estimate.

The weights are combined with the hard decisions at block 716 to form weighted constellation points. The weights may be combined with the hard decisions in any number of ways. For example, the weights may be manipulated before being combined with the hard decision if an offset binary format is desired. As another example, the weights can be directly combined with corresponding hard decisions if a sign/magnitude format is desired.

Further processing can be employed on the weighted constellation points at block 718. For example, errors may be detected and corrected.

Figure 8:
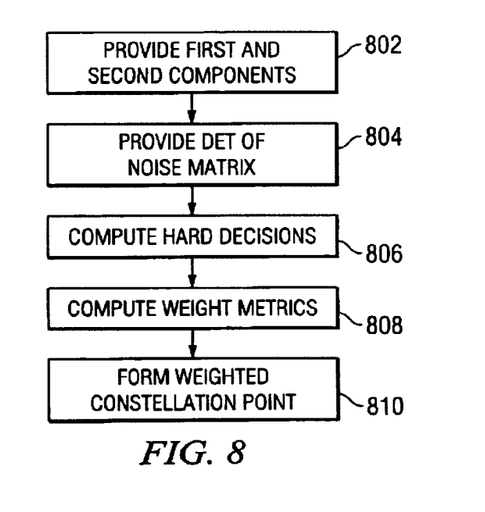
FIG. 8 is a flow diagram illustrating a method of performing slicing operations in accordance with one aspect of the present invention.

FIG. 8 is a flow diagram of a method of performing slicing operations according to one aspect of the present invention. While the following method is illustrated with respect to a single weighted constellation point, it is to be appreciated that the methodology can be implemented on any number of weighted constellation points, such as those from a data burst. Furthermore, the methodology is not limited to any constellation size. Additionally, the methodology can be implemented on both wired and wireless data signals. However, the methodology is not limited to communication systems. That is, the methodology has applications to any type of system that utilizes slicing, such as assigning weights or confidences to a constellation point.

A first component and a second component of a constellation point estimate are provided at block 802. A beamformer or beamforming process may provide the first and second components. The first and second components may correspond to numerator and denominator portions of the constellation point estimate. According to one aspect of the present invention, the first component corresponds to a numerator of the constellation point estimate and the second component corresponds to a denominator of the constellation point estimate. It is appreciated that determining the constellation point estimate is not required by this method, thus requiring less processor cycles than conventional systems.

A determinant of a noise estimate matrix R is provided at block 804. A noise estimator or noise estimation process typically provides the noise estimate matrix R. The determinant may be computed by another component or process such as a slicer. The noise estimator provides a measure of the noise residing at a given data tone carrier frequency.

A plurality of hard decisions are iteratively computed as a function of the first and second components at block 806. The number of iterations performed, and therefore the number of hard decisions computed, depend on the constellation size or bit size representation of the constellation point.

A plurality of weight metrics are iteratively computed at block 808 as a function of the first and second components and the determinant of the noise estimate matrix. The number of iterations performed, and therefore the number of weight metrics computed, depend on the constellation size or bit size representation of the constellation point. According to an alternate aspect of the invention, the weight metrics are iteratively computed as a function of the first and second components and the noise estimate.

The plurality of weight metrics are correspondingly combined with the plurality of hard decisions to form a weighted constellation point estimate at block 810. The weighted constellation point estimate may be formed in a variety of formats, such as, sign/magnitude or offset binary.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A signal processing system comprising:
   a noise estimator operative to compute noise estimates for a plurality of data tones;
   a beamformer operative to compute a first component of a constellation point estimate based at least in part on the noise estimates for the data tones and a second component of a constellation point estimate based at least in part on the noise estimate for the data tones, a ratio of the first and second components corresponding to the constellation point estimate; and
   a slicer that iteratively computes a weighted constellation point estimate based on the first component, the second component and the noise estimates.

2. The signal processing system of claim 1, the slicer further comprising:
   a hard slicer operative to iteratively compute hard decisions;
   a weight determiner operative to iteratively compute weights for the hard decisions; and
   an aggregator operative to combine the weights and the hard decisions into a weighted constellation point estimate.

3. The signal processing system of claim 2, the hard slicer computing the hard decisions as a function of the first component and the second component without a divide operation between the first and second components.

4. The signal processing system of claim 3, the weight determiner computing the weights based on the first component, the second component and the noise estimates for each respective data tone.

5. The signal processing system of claim 1, the slicer utilizing less than 11 divides per data tone.

6. The signal processing system of claim 1, the slicer utilizing a single divide per data tone.

7. The signal processing system of claim 1, the beamformer being operative to receive a plurality of data signals, a plurality of channel estimates and the noise estimates and to compute the first and second components for each respective data tone as a function of at least one of the data signals, at least one of the plurality of channel estimates and at least one of the noise estimates.

8. The signal processing system of claim 2 implemented as part of an application specific integrated circuit.

9. The signal processing system of claim 2 implemented as executable instructions programmed in a digital signal processor.

10. A soft slicer comprising:
    a confidence determiner that iteratively calculates a number of confidence values as a function of a first component, a second component and a third component, a ratio of the first component and the second component defining a constellation point estimate and the third component being portions of noise estimates for a data tone;
    a hard slicer that iteratively calculates a number of hard decisions as a function of confidence values as a function of the first component, and the second component, without performing a divide operation relative to the first and second components;
    a weight determiner that iteratively computes a number of weight metrics as a function of the first component, the second component and the third component; and
    an aggregator that combines each of the weight metrics with a respective hard decision to form a weighted constellation point estimate for each data tone.

11. The soft slicer of claim 10, the number of hard decisions being functionally related to a number of bits used to represent each constellation point estimate.

12. The soft slicer of claim 11, the number of hard decisions corresponding to a constellation point size for a received data signal.

13. The soft slicer of claim 10, the weight metrics being computed without performing more than one divide operation.

14. The soft slicer of claim 10, further comprising a noise determinant component that computes and stores an inverse of a determinant of a noise estimate.

15. The soft slicer of claim 14, the noise determinant component computing the determinant of the noise estimate as a function of the third component.

16. The soft slicer of claim 14, the inverse of the determinant of the noise estimate having a plurality of values, the noise determinant component computing and storing the inverse of the determinant at a decimated rate such that only a predetermined portion of the plurality of values of the inverse of the determinant is updated for a given data burst.

17. The soft slicer of claim 10, the first component being a numerator portion of a constellation point estimate and the second component being a denominator portion of the constellation point estimate.

18. The soft slicer of claim 10 implemented as part of a wireless communication system.

19. A wireless communications system, comprising:
    a preprocessing system operative to process at least one received data burst and to convert the at least one received data burst into at least one digital signal in the frequency domain having a plurality of tones that comprise a plurality of data tones;
    a noise estimator operative to estimate noise for the at least one preprocessed digital signal and provide an indication of estimated noise for the plurality of data tones;

a beamformer operative to perform beamforming computations for the plurality of data tones as a function of the indication of estimated noise, a plurality of first components and a plurality of second components, the first and second components for each data tone being portions of a constellation point estimate for each respective data tone; and a soft slicer operative to perform slicing computations as a function of the plurality of noise estimates, the plurality of first components and the plurality of second components to compute a plurality of weighted constellation points without dividing the first and second components.

20. The communication system of claim 19, further comprising a data processor operative to detect and correct errors in the weighted constellation point estimates.

21. The communication system of claim 20, the data processor including a Viterbi decoder.

22. The communication system of claim 19, each of the weighted constellation point estimates is represented by at least two bits.

23. A wireless communication system comprising:

noise estimation means for estimating noise for a plurality of data tones of at least one received data signal;

beamforming means for performing beamforming computations for the plurality of data tones of the digital signal to provide first and second components of a constellation point estimate; and slicing means for computing weighted constellation points for the plurality of data tones from the first and second components and a noise estimate.

24. A method comprising:

receiving a data signal having a plurality of data tones;

computing noise estimates for the plurality of data tones;

computing first and second components of constellation point estimates at least partially based on the noise estimates;

determining hard decisions as a function of the first and second components;

computing a weight for each hard decision as a function the first and second components and the noise estimates; and combining the weights with the hard decisions to form weighted constellation point estimates.

25. The method of claim 24, the weight for each hard decision being computed as a function of the first and second components and an average of the noise estimates for each of the plurality of data tones.

26. The method of claim 24, the hard decisions being determined without utilizing a divide operation relative to the first and second components.

27. The method of claim 24, the weights being computed with less than 11 divide operations.

28. The method of claim 24, further comprising detecting and correcting errors in the weighted constellation point estimates.

29. The method of claim 24 implemented as part of a wireless communication system.

30. The method of claim 24, the noise estimates, the first and second components, the hard decisions and the weights being computed for each respective data tone.

31. The method of claim 24, the weight for each hard decision being computed as a function of the first and second components and an inverse of the determinant of the noise estimates, the inverse of the determinant having a plurality of values and being computed at a decimated rate such that only a predetermined portion of the plurality of values of the inverses of the determinant is updated for a given data burst.

32. A digital signal processor programmed to perform a method comprising:

receiving a data signal having a plurality of data tones;

computing noise estimates for each of the plurality of data tones;

computing first and second components of constellation point estimates as a function of the noise estimates for each respective data tone;

determining hard decisions as a function of the first and second components for each respective data tone;

computing a weight for each hard decision as a function of the respective first and second components and the respective noise estimates for each respective data tone; and combining the weights with the hard decisions to form weighted constellation point estimates for each of the plurality of data tones.

* * * * *